United States Patent Office 2,965,300
Patented Dec. 20, 1960

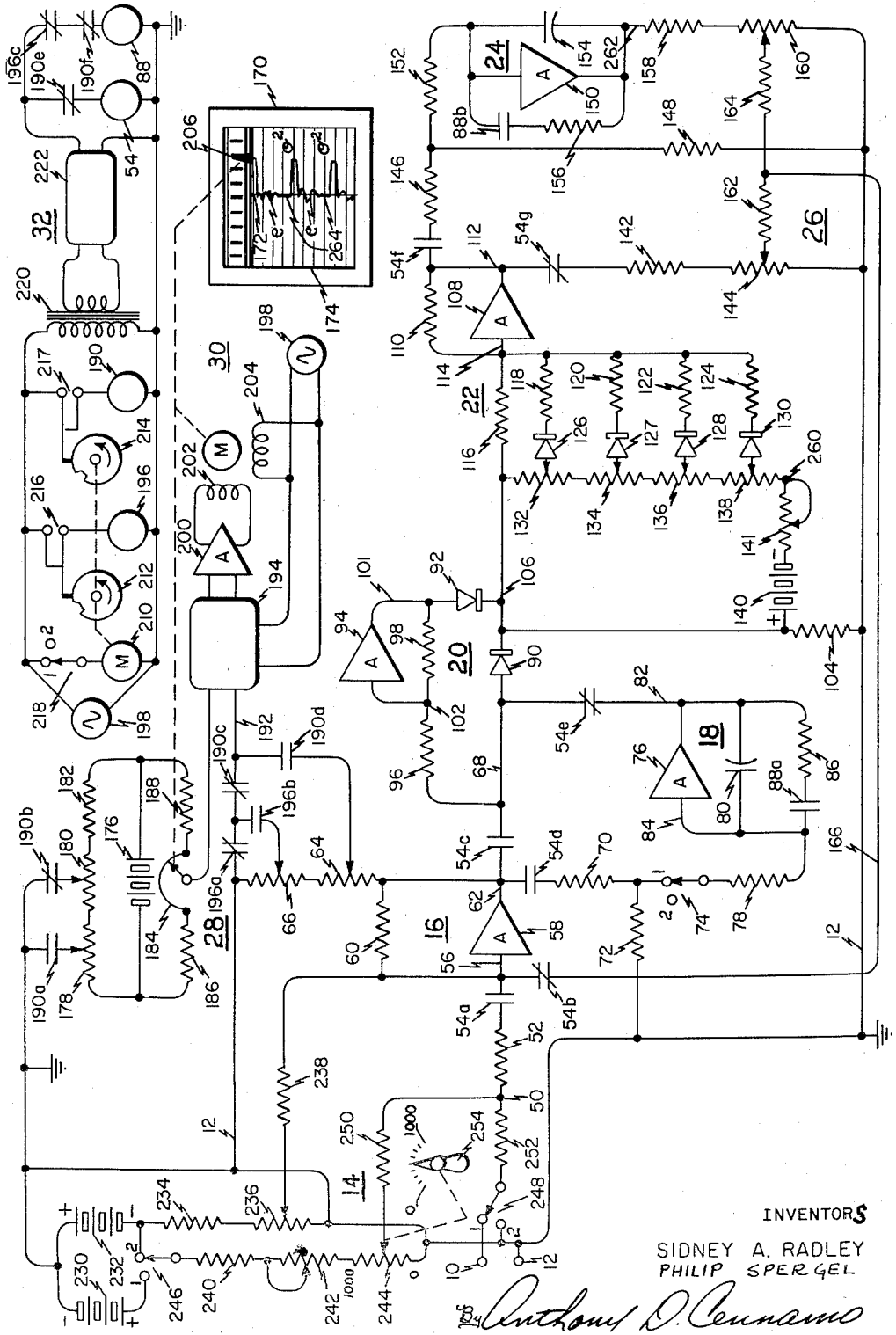

2,965,300
EVALUATION COMPUTER

Sidney A. Radley, Columbus, Ohio, and Philip Spergel, Saxonville, Mass., assignors to Industrial Nucleonics Corporation, a corporation of Ohio Filed July 1, 1957, Ser. No. 668,935

9 Claims. (Cl. 235—193)

This invention relates to an automatic computer, and more particularly it relates to an electrical analog system for computing statistical variance.

"Variance" is a measure of dispersion which is very useful in statistical analysis, being employed directly in many investigations. More commonly, variance is converted by taking the square root thereof to the more familiar quantity referred to as "sigma" or standard deviation. Standard deviation may be defined as the root mean square of the differences between the individual measured values of a common characteristic in each of a large group of similar items and the arithmetic mean value of that characteristic in the whole group. Accordingly, variance may be calculated by the formula:

$$\text{Variance} = \sigma^2 = \frac{\Sigma(X-\bar{X})^2}{N} \tag{1}$$

where $\sigma$ (sigma) represents the standard deviation, $X$ is the measured value of the characteristic of interest in an individual item, $\bar{X}$ is the arithmetic mean, that is, the sum of all measured values divided by the total number of items measured, $\Sigma$ indicates that all values of $(X-\bar{X})^2$ are to be added, and $N$ represents the total number of items. A more convenient equivalent of Formula 1 is $$\sigma^2 = \frac{\Sigma X^2}{N} - \left(\frac{\Sigma X}{N}\right)^2 \tag{2}$$

which simplifies the computation of variance by manual methods as well as by the automatic method of this invention.

In modern manufacturing operations, the determination of statistical quantities such as variance or sigma is such an important part of the quality control function that in the past an appreciable amount of time, expense, and labor has been consumed in gathering samples, measuring and classifying the same, recording data and making the necessary computations therewith. In general these expenditures have been more than justified by the results achieved in bringing manufacturing processes under statistical control. They have been invaluable in optimizing the selection of raw materials and sources thereof, in comparative appraisal of alternative manufacturing methods, in evaluating the effects of environmental factors on the performance of workmen, in determining the inherent precision of various types of machines, in timely detection of maladjustment or impending failure of machinery in service, in establishing realistic tolerances, in improving vendor-consumer relations and in general upgrading the quality of manufactured goods.

Despite the proven merit of the statistical process control method, the full utilization thereof has been severely curtailed in the past by two major limitations. Firstly, the laborious nature of the sampling, measurement and computational procedures has generally confined the data available for investigation to a very small fraction of the total production. Accordingly, in one alternative sample-collecting procedure, the samples have been so widely spaced in time that true dispersion could be masked by shifting quality levels. On the other hand, if comprehensive sampling was done, the length of time elapsing between tests was so great that often adverse trends were not detected in time to prevent a process from going completely out of control. Secondly, in any case, the final results of these tests were not available for some time after the samples had been collected, so that in the event of serious trouble a quantity of the product already made often had to be scrapped or reworked. In short, the information gained through these manual procedures has had a tendency to be too little and too late.

In accordance with this invention, a process is comprehensively monitored by computer means providing automatic variance readout at predetermined intervals. The preferred embodiment of the invention as described herein is particularly well adapted for use in controlling an industrial process wherein there is a continuous flow of a finished or semi-finished product past a measuring point. This is the case, for example, in the manufacture of cigarettes, textiles, paper, rubber and plastics goods, foods, metals and the like; a characteristic of which can be measured in a continuous manner by means of a gauging device such as is described in a co-pending application Serial No. 641,414, filed February 20, 1957, by Philip Spergel and Sidney A. Radley. In Figure 1a of that application, it is seen that the measuring instrument provides an electrical voltage appearing between point 100 and line 90 which represents the instantaneous deviation of the measured characteristic from a desired value. This voltage may constitute the input to the computer of the present invention in a preferred form thereof.

As is known, the Formula 2 given above for statistical variance is equally valid if the symbol $X$ is used to denote the positive or negative deviation of the characteristic value of an item from some arbitrary value which may or may not correspond to the actual mean value of a sample group.

Where the value of the measured variable $X$ is represented by an electrical voltage, Formula 2 can be represented by its electrical analog $$\sigma^2 = \frac{1}{T}\int_0^T e^2 dt - \left(\frac{1}{T}\int_0^T e\, dt\right)^2 \tag{3}$$

wherein $e$ represents the instantaneous value of the electrical signal and the time $T$ is analogous to the number of items $N$. Again, Formula 3 is equally valid where $e$ is used to denote the positive or negative deviation of the signal representing the measured characteristic from a desired value which may or may not correspond to the mean value of the signal over a period of time.

It is the object of this invention to provide automatic means for computing process variance.

It is a more specific object to provide an analog computer for determining the statistical variance of a variable characteristic translatable into voltage by automatically evaluating Equation 3 above.

It is another object to provide such a variance computer which is fully automatic in operation, and which is capable of immediately and repeatedly indicating and/or recording the computed variance at the end of successive evaluation intervals.

It is a further object to provide means whereby an industrial process can be kept under comprehensive statistical observation at all times without the necessity for conducting manual sampling, measurement or computational procedures.

It is a still further object to provide a variance computer in accordance with the preceding objects which is relatively inexpensive to build, simple to operate, and which requires a minimum of adjustment and maintenance.

Other objects and advantages will become apparent in view of the following detailed description and appended drawing in which:

The single figure is a simplified schematic showing of a typical apparatus in accordance with the present invention.

Referring now to the drawing, the numeral 10 indicates an input terminal adapted for connection to an electrical signal proportional to a characteristic whose statistical variance is to be determined, whereas the numeral 12 indicates the ground reference terminal therefor. Designated generally by the numeral 14 is an input calibrating network. A conventional operational amplifier stage 16 is illustrated as comprising the coupling between the computer of the present invention and the measuring and/or controlling device, since it is usually necessary or at least desirable to isolate the circuits of the computer therefrom. An integrating amplifier 18 is used to compute the summation of the input signal representing the value of the mean. At 20 is an absolute converter circuit which feeds a squaring circuit 22. Since conventional squaring circuits require a unidirectional input, an absolute value converter is necessary to adapt the present computer for the type of polarity-reversible input described above and the present invention is accordingly illustrated as employing such a converter, although the same may be omitted where the input to the computer is not subject to reversals of polarity. At 24 is a further integrating amplifier utilized to compute the summation of the squared input signal. At 26 is a difference network wherein a signal representing variance is computed. At 28 is a slidewire rebalancing potentiometer network which is associated with a recording apparatus 30 whereon variance values are indicated and recorded. The numeral 32 generally designates timing and switching circuits for appropriately controlling the sequence of computation and readout.

Proceeding now with a more detailed description, the calibrating network 14 will be neglected for the moment and it will be assumed that an input signal is present at point 50. This signal may be transmitted through an input resistor 52 and relay contacts 54a to the input terminal 56 of amplifier 58. The high gain operational amplifier 58 has a feedback resistor 60 connecting its output to its input 56 so as to maintain the latter at substantially zero potential, thereby insuring accurate correspondence of the output voltage with the input voltage.

The output of amplifier stage 16 appears across the voltage divider combination of a resistor 64 and a potentiometer 66 which is grounded on line 12. Through relay contacts 54c and 54d this output may also be applied to the input 68 of the converter 20 and may be connected across the voltage divider combination of resistors 70 and 72, one end of the latter being connected to ground on line 12. The portion of this voltage appearing across resistor 72 may be connected to the input of the mean integrator 18 through switch 74.

The mean integrator 18 in its preferred form comprises an operational amplifier 76 having an input resistor 78 and a capacitor 80 connecting its output 82 to its input 84. By closure of a set of relay contacts 88a a shunt resistance may be connected across capacitor 80 in order to discharge the same, thereby resetting the integrator.

It will be noted that relay contacts 54c and 54e provide a means whereby the input 68 of the absolute converter 20 may be disconnected from the output 62 of amplifier stage 16 and connected to the output 82 of the mean integrator 18.

The converter 20 comprises a pair of diode rectifiers 90 and 92 and an amplifier 94 which functions as a phase inverter. Amplifier 94 is an operational amplifier having an input resistor 96, and a feedback resistor 98 connecting the output 101 of the amplifier 94 to the input 102 thereof. This amplifier operates with unity gain. Thus if the converter input 68 is at a positive potential with respect to ground line 12, the diode 90 will conduct so that the potential on line 68 will appear directly across resistor 104 at the input 106 of the squarer 22. If the potential on line 68 is negative it is blocked by diode 90, but amplifier 94 inverts the signal, diode 92 conducts and a positive voltage equal to the negative signal on line 68 will appear at the input 106 of the squarer. This type of converter is used instead of the conventional bridge rectifier or equivalent device to avoid isolation of the output from the input.

The squaring circuit 22 includes an operational amplifier 108 having a feedback resistor 110 connecting its output 112 to its input 114, and a plurality of input resistors 116—124. Resistors 118—124 are each connected through a diode rectifier 126—130 to the variable tap of a potentiometer in the group 132—138 which comprises a voltage divider energized from a voltage source represented by the battery 140. The total voltage available across the network is adjustable by means of rheostat 141. The diodes 126—130 are thus biased at successively increasing voltage levels. The effective gain of amplifier 108 is proportional to $R_o/R_{in}$ where $R_o$ is the value of resistor 110 and $R_{in}$ is the input resistance. For a low value of the signal on the input 106 of the squarer, all diodes 126—130 are biased out of conduction so that $R_{in}$ is equal to the resistance 116. At a predetermined signal level sufficient to overcome the bias on the diode 126, $R_{in}$ becomes substantially equal to the resistance of 116 and 118 in parallel. Similarly a further predetermined increase in the signal level results in the parallel addition of resistor 120 in the input circuit, etc. Hence to a continuously varying input voltage, the amplifier responds with an output voltage which is proportional to the product of the input voltage and the reciprocal of an input resistance which is caused to vary stepwise in inverse proportion to the input voltage. With proper adjustment of potentiometers 132—138, the device as shown using four diodes is subject to a maximum error of about four percent. Increasing the number of diodes and associated resistors and potentiometers improves the accuracy, and it has been found that the use of eight diodes reduces the maximum error to less than one percent. The squaring circuit shown has advantages in that it has faster response and is much less expensive than servo potentiometer multipliers, whereas it does not suffer from undue dependence on tube characteristics, etc., as is the case with many all-electronic squaring devices.

From Equation 3 it might be inferred that two such squaring devices are necessary in the computer, since both the quantity $e$ per se, and the integral thereof over the period of time T, must be squared in order to arrive at the variance figure. Although the use of duplicate squarers has been contemplated and is considered to be the one obvious modification of the invention, it has been noted that the two squarers would not need to be operative simultaneously; that is to say, the operation of squaring the signal $e$ must be performed continuously during the entire time interval T in order for the integration of $e^2$ to be effected and the integral of $e$ is not available for squaring until the end of the interval T. Accordingly, in the preferred embodiment of the invention herein shown, a single squaring device is used to perform the two different squaring operations alternately. To this end, the squarer input is switched to alternatively connect the same to two different input circuits by relay contacts 54c and 54e ahead of the absolute converter as aforesaid.

The output of the squarer may be applied alternatively across either of the voltage divider combinations of resistor 142 and potentiometer 144 or resistors 146 and 148, depending on the condition of relay contacts 54f and 54g. With contacts 54f closed, the portion of the squarer output appearing across resistor 148 is applied to the input of integrator 24. The integrator 24 is similar to integrator 18 and comprises an amplifier 150, input resistor 152, and capacitor 154. A shunt resistor 156 discharges capacitor 154 when relay contacts 88b are closed to reset the integrator. The output of the integrator appears across the combination of resistor 158 and potentiometer 160.

A pair of identical resistors 162 and 164 interconnect the variable taps of potentiometers 144 and 160, so that the voltage appearing on line 166 connected to the junction of resistors 162 and 164 is the difference between the voltages on the taps. This difference may be fed back through relay contacts 54b to the input 56 of amplifier 58 as an alternate for the signal input from the measuring device, as is the case when the signal on line 166 represents the computed variance; which circumstance is more fully explained in the description of the computer operation appearing hereinafter.

Any suitable type of readout device may be employed to indicate or record the computed variance. The system illustrated utilizes a strip chart recorder 170 whereon there is presented a cyclic indication comprising a record of the error signal whose variance is being computed followed by a record of the variance value thereof. Since the error signal is a signed quantity, variations therein are given with respect to the center line 172 of the chart, whereas variance may be given with respect to the left end 174, since variance is a scalar quantity subject to appreciable variations in magnitude. The readout device 30 is a conventional null-balance type of recording potentiometer. The source of the balancing voltage is a bridge circuit energized by the battery 176, having a pair of potentiometers 178 and 180 and a resistor 182 in one arm thereof and a slidewire potentiometer 184 together with a pair of end resistors 186 and 188 in the other arm. Potentiometers 178 and 180 respectively permit adjustment of the left end and center positions of the slidewire arm where the bridge attains a balanced condition and produces zero null voltage output. The associated relay contacts 190a and 190b permit automatic shifting from one balance point to the other. The signal to be recorded is applied to line 192 at the input of a chopper 194. Depending on the conditions of relay contacts 190c, 190d, 196a and 196b, the recorder input line 192 may be connected to ground 12 to secure zero input voltage, or connected to the variable tap of potentiometer 66 to obtain the amplified process error signal, or connected to the junction of resistor 64 and potentiometer 66 to obtain the variance signal.

The chopper 194 is of the well-known type having vibrating switch contacts driven at 60 c.p.s. from the conventional 115 v. A.C. power source 198. Whenever the voltage output of the bridge circuit appearing on the variable tap of the slidewire 184 is not equal and opposite to the recorder input voltage on line 192, a current will flow through the contacts of the chopper 194 which will thereupon deliver a 60 c.p.s. alternating signal to the input of the servo amplifier 200, whose output in turn is applied across the sense winding 202 of a servo rebalancing motor. The phase winding 204 of the servo motor is energized from the line voltage source 198. The output of the servo amplifier 200 will have one of two directly opposite phases, depending on the polarity of the input 192 to the chopper 194, which determine the direction of motor rotation. The servo motor drives the indicator 206 of the recorder 170 and also drives the arm of the slidewire 184 to achieve continuous rebalancing in the well-known manner.

The timing and switching circuits 32 control the sequence of operation in the computing cycle. One of the simplest of many useable types of timing and switching arrangements is illustrated, comprising a synchronous motor 210 energized from the conventional line voltage source 198 and a cam and switch mechanism for actuating the relays which, in turn, switch the various circuits of the computer. The motor 210 drives a pair of cams 212 and 214 which respectively actuate a pair of snap-action switches 216 and 217 controlling the application of power to relay coils 196 and 190. Power to the timer motor 210 is applied through a switch 218 which allows the timer to be stopped at any point in its cycle for adjustment and test purposes. A transformer 220 is used to energize a D.C. power supply comprising a bridge rectifier 222 which provides a unidirectional voltage for operating relays 54 and 88.

Referring now to the input calibrating network 14, there are shown a pair of batteries 230 and 232 having a common connection to ground 12. These batteries represent a conventional power supply providing B+ and B— voltages with respect to ground and adapted to power the various operational amplifiers shown schematically in the circuits of the computer. A voltage divider comprising resistor 234 and potentiometer 236 is connected between the B— output of battery 232 and ground 12. The variable tap of potentiometer 236 provides an adjustable negative bias for the input 56 of amplifier 58 applied thereto through a resistor 238. The set-up of the computer is facilitated by a reference signal calibrating network comprising a voltage divider which includes a resistor 240, rheostat 242 and potentiometer 244, and which may be connected across either the B+ or B— voltage supply by means of a switch 246. An additional switch 248 is also provided whereby the signal input on terminal 10 may be disconnected from the computer while the calibrating voltage is applied. When switch 248 is connected to ground 12, the voltage at the arm of potentiometer 244 appears across the voltage divider comprising resistors 250 and 252. The portion of this voltage across resistor 252 is then applied to the input of the computer at point 50. Potentiometer 244 is equipped with a graduated dial 254 which divides its total voltage span into a number of equal increments. Thus dial 254 may read zero when the arm of potentiometer 244 is on the grounded end thereof, and may read 1000 on the opposite end.

In initially setting up the computer, the timer motor 210 may be de-energized by means of switch 218 when the cams 212 and 214 are in position as shown, so that relay 196 is energized and relay 190 is de-energized. Relay 54 will now be energized through contacts 190e of relay 190, whereas contacts 196c will remove power from relay 88. Accordingly relay contacts 54a–54g will not be in their normally open or closed positions as shown, but in a directly opposite condition. Switch 248 is placed in position No. 2, and dial 254 is turned to zero to obtain zero input to amplifier 58 through relay contacts 54a. Bias potentiometer 236 is now adjusted to obtain zero output from amplifier 58 on line 62.

The squaring circuit bias potentiometer 141 is adjusted to obtain an arbitrary value of the potential between point 106 and 260 which may be restored at any later time, in the event that the voltage source 140 should exhibit an altered output, as would occur for example, as a result of battery decay. By means of dial 254, the output of amplifier 58 appearing on lines 62 and 68 may be set to any convenient value for checking the squaring circuit function. It has been found appropriate to design the squarer 22 so that with proper adjustment the output on line 112 is equal to one-tenth the square of the converter input on line 68. Potentiometers 132—138 are set in order, and in accordance with measurements of arbitrarily set potentials on line 68 and the corresponding squarer output potentials on line 112 to obtain the best approximation to the ideal squarer function consistent with the number of diodes provided in the squarer circuit.

It is now necessary to calibrate the computer circuits to match the function of the electrical signal provided by the associated measuring device. Such calibration is facilitated by the calibrated network associated with dial 254, to which the measuring instrument function may be conveniently transferred and expressed in terms of dial settings thereon. An exemplary calibration procedure will be given, assuming that the computer is to be used in conjunction with the measuring and controlling apparatus described in the above-referenced co-pending application, which instrument provides a D.C. signal having a polarity and magnitude in accordance with the deviation of the measured characteristic from a set point. It will also be ssumed that it is desired to record on instrument 170 the deviation of the measured process from the set point, said deviation being expressed in terms of a percentage of the set value. Accordingly, the standard deviation or sigma should also be expressed as a percentage, with variance values being recorded as the square thereof.

It is assumed that the center and left end balance points for the recorder null voltage bridge circuit are correctly set on potentiometers 178 and 180. It is now necessary to obtain an error signal from the measuring device representing a known percentage deviation of the measured characteristic from the set point. For example, if the error signal appears between point 100 and ground line 90 shown in Fig. 1a of the above referenced co-pending application; referring to that figure, the target adjustment 93 may be set to the desired control point and switch 82 may be closed to short out all signals at the input of the gauge amplifier. The zero set control 72 may now be adjusted until the reading of the measuring indicator 76 deviates from the control point by a desired percentage, whereupon the signal appearing at point 100 will be the electrical representation thereof. Referring again to the schematic drawing of the present invention, this signal is connected to input terminal 10 and is applied to the computer when switch 248 is placed in position No. 1. Dial 254 is now set to zero. The signal after amplification in stage 16 appears across resistor 64 and potentiometer 66, whose variable tap is connected to the input 192 of the recorder through relay contacts 196b and 190c. Assuming for example, that it is desired to calibrate the scale on recorder 170 to read from minus ten percent deviation at the left end thereof to plus ten percent at the right end, and that the error signal being fed into the computer has been adjusted to represent a ten percent deviation, potentiometer 66 is now adjusted until the recorder indicator 206 registers with the left or right end of its associated scale, depending on the direction of the error signal input. The recorder reading should now agree with the calibration of the gauge-controller, whose error voltage function may now be transferred to the calibrating dial 254 by placing switch 248 in position No. 2, setting dial 254 to 1000 and adjusting rheostat 242 until the recorder indicator 206 again registers with the left or right end of its associated scale depending on the position of polarity switch 246. Accordingly, a dial setting of 1000 represents in this example a ten percent deviation; one dial division is equivalent to one one-hundredth of one percent, etc. It has been found advisable to measure the voltage at point 50 corresponding to dial setting 1000 by means of a vacuum tube voltmeter to facilitate final calibration of the computer.

In setting up the desired span of the variance readings on the scale 170 of the recorder, the mean integrator switch 74 is opened to disable the integrator 18. By this means the second term on the right hand side of Equation 3 is arbitrarily reduced to zero so that the indicated value of variance will be simply the integral of the squared error signal multiplied by a constant. A known error signal equivalent to the square root of the desired variance span is set on dial 254. For example, if the span of the variance scale desired is 20 variance units, the error signal desired should represent $\sqrt{20}$ or 4.472% deviation. Since the range of 1000 divisions on dial 254 has been adjusted to represent 10%, the required dial setting is 447.2. The span adjustment is made with the timer switch 218 closed and the timer in operation. The switching cycle is as follows:

Both cams 212 and 214 rotate at the same angular speed, driven by the synchronous motor 210. At a point in the rotation of cam 214, switch 217 closes, energizing relay 190. Relay 196 is still energized through switch 216. Relays 54 and 88 are de-energized since contacts 190e, 190f, and 196c are open. Variance readout occurs at this time, but adjustment must be postponed until the completion of a full integrating cycle. During the variance readout period, the rotation of cam 212 opens switch 216, de-energizing relay 196. A short time later, further rotation of cam 214 de-energizes relay 190. At this point, relays 190 and 196 are both de-energized, while relays 54 and 88 are both energized. The recorder input on line 192 is grounded through relay contacts 190c and 196a. The arm of potentiometer 180 in the bridge circuit is also grounded through contacts 190b, whereupon the servo motor will drive the arm of slidewire 184 to the point of balance at the center thereof. Relay contacts 88a and 88b respectively short-circuit capacitors 80 and 154 of integrators 18 and 24 to reset the same.

The regular computing cycle begins when cam 212 closes switch 216, energizing relay 196. Contacts 196a disconnect the recorder input line 192 from ground and contacts 196b connect the same to the arm of the process span potentiometer 66. Contacts 196c de-energize relay 88. Since relay 190 is deenergized, its contacts 190a are open and its contacts 190b connect the arm of potentiometer 180 to ground. The signal at point 50 representing, in this example, 4.472% deviation is amplified by stage 16 and recorded on the instrument 170. Since switch 74 is open the mean integrator 18 sees no signal. The signal on line 68 is squared, and the squared signal is integrated by integrator 24.

The integrating cycle ends when cam 214 closes switch 217 and thereby energizes relay 190. Contacts 190a and 190b switch the ground reference for the recorder signal from the arm of potentiometer 180 to the arm of potentiometer 178. Contacts 190c open, and contacts 190d connect the recorder input line 192 to the junction of resistors 64 and 66. Contacts 190e deenergize relay 54. Contacts 190f open, insuring that relay 88 will remain de-energized after contacts 196c close during the variance readout period. If desired, switch 218 may be opened at this point to interrupt the timing cycle while the variance span is being adjusted. Relay contacts 54a are now open, disconnecting the signal input at point 50 from amplifier 58, whose input 56 is now connected to line 166 through contacts 54b. Contacts 54c are open, disconnecting the output of amplifier 58 from the converter input line 68. Line 68 is connected instead to the output 82 of the mean integrator 18 through contacts 54e; however, the mean integrator output is zero at this time since switch 74 was open during the integrating cycle. Contacts 54f are open, disconnecting the input to integrator 24. Contacts 54g are closed, connecting the output 112 of the squarer across resistor 142 and potentiometer 144. However, at this time there is no voltage output from the squarer. The absence of a signal on potentiometer 144 thus reduces the second term of variance Equation 3 to zero. The integrator 24, however, provides an output voltage across resistor 158 and potentiometer 160 which is proportional to the squared value of the deviation voltage applied during the integrating cycle. By means of potentiometer 160, the constant factors introduced in the circuits of the computer may now be adjusted to a net value of $1/T$, so that the potential on line 166 will represent the first term of Equation 3. This is the case when the signal fed back to amplifier 58 is of a value which produces the proper variance indication on the recorder 170; in this example, 20 variance units to the right of the index line 174.

On obtaining the proper setting of the variance span potentiometer 160, it is necessary to properly adjust the mean balance potentiometer 144. For this purpose the timer is allowed to run through another cycle, but in this case the mean integrator switch 74 is closed, allowing the mean integrator 18 to integrate the error signal. During the next variance readout period, therefore, the output of the mean integrator is processed by the converter 20 and the squarer 22, so that the voltage across potentiometer 144 in the output circuit of the squarer will not be zero as before, but instead will be proportional to the second term of Equation 3. Since the input voltage applied during the integrating cycle is a steady unidirectional signal, the second term of the equation in this case should be equal in magnitude to the first term, thus producing a zero variance indication. Accordingly by adjusting potentiometer 144 to obtain a zero variance indication on index line 174 of the recorder 170, the net value of the constant factor in the second term of the equation is adjusted to represent $1/T$.

The instrument is now calibrated, in this example, to indicate on recorder 170 the deviation of the measured process from $-10\%$ to $+10\%$, and to record variance values from zero to 20 variance units. If desired, the reference point for the span of 20 variance units may be shifted by an adjustment of potentiometer 178. For example, if it is desired to place on the recorder 170 a variance scale of 10–30 variance units, the computer may be allowed to run through another cycle with the mean integrator switch 74 open and with a 4.472% error signal injected as before. In this case, potentiometer 178 will be adjusted during the variance readout to obtain a variance reading of 20 on the 10–30 scale instead of at the right end of the scale as described above in the procedure for setting variance span.

Obviously, if desired, the scale and associated strip chart on the recorder may be constructed so as to indicate the square root of the variance reading, thereby presenting recorded values directly in terms of sigma.

In the event that it is necessary for the computer to perform with exceptional accuracy, or if it is desired that its variance readings be brought into agreement with the results of a manual sampling and computational procedure already standardized by a quality control organization, the computer settings may require a compensating adjustment. Such an adjustment is performed when a quantity of the product has been evaluated for variance both by manual procedures and by the computer as calibrated according to the direct method described hereinabove. The required compensation is expressed in terms of a new voltage level to be made available across calibrating potentiometer 244. Recalling that the original calibration was based on a voltage $E_a$ which could be measured between point 50 and ground 12 when switch 248 was placed in position No. 2 and dial 254 was set to 1000, a new voltage $E_b$, compensated for the discrepancy between the computer variance reading and the manually calculated variance, may be determined by $$E_b = E_a \sqrt{\frac{\sigma_a^2}{\sigma_b^2}}$$

where $\sigma_a^2$ is the computer reading and $\sigma_b^2$ is the calculated variance. The new calibrating voltage $E_b$ may be established by a readjustment of rheostat 242, whereupon the variance span potentiometer 160 and the mean balance potentiometer 144 may be readjusted by repeating the procedure above described.

The normal operation of the computer is as follows. It is assumed that the apparatus is properly calibrated, that dial 254 is set to zero, that switch 248 is in position No. 1, and that a signal representing the value of a variable characteristic is furnished to the input terminals 10 and 12 of the computer by a suitable measuring device. Assume that the timer motor 210 is in operation and that the timer is at a point in the cycle where relays 190 and 196 are both de-energized. Accordingly, relays 54 and 88 are both energized. The signal from the measuring instrument is connected through input resistor 52 and relay contacts 54a to amplifier 58. The amplified voltage $e$ representing the value of the measured characteristic appears on line 62. However, the computer is inoperative since this is the point where resetting occurs, and is referred to as the "clamp" period. The value of $e$ is not recorded, since the recorder input 192 is grounded through relay contacts 190c and 196a. The arm of potentiometer 180 in the bridge circuit providing the null balance voltage is also grounded through relay contacts 190b. The recorder pen will accordingly draw a straight line as at 264 up the center of the recorder chart to indicate the clamp period. During the clamp period, relay contacts 88a connect shunt resistor 86 across capacitor 80 to discharge the same, thereby resetting the mean integrator 18. Similarly, contacts 88b effect resetting of integrator 24.

The clamp period ends when cam 212 closes switch 216, thereby energizing relay 196. Contacts 196c de-energize relay 88, whose contacts 88a and 88b open, enabling integrators 18 and 24 to function. Contacts 196a remove the recorder input 192 from ground and contacts 196b connect the same to the arm of potentiometer 66. The amplified voltage $e$ representing the value of the measured characteristic which appears on line 62 at the output of the amplifier 16 is recorded on the instrument 170. A voltage proportional to the integral of $e$ accumulates on line 82 of the mean integrator 18. A voltage proportional to $e^2$ appears on line 112 at the output of the squarer and a voltage proportional to the integral of $e^2$ accumulates on line 262 at the output of the integrator 24.

The recording and integrating period ends when cam 214 allows switch 217 to close, energizing relay 190. Contacts 190b remove the arm of potentiometer 180 in the bridge circuit from ground, and contacts 190a ground the arm of variance reference potentiometer 178 instead. Contacts 190c remove the recorder input 192 from the arm of potentiometer 66 and connect said recorder input to the junction of resistor 64 and potentiometer 66 across the output of amplifier 16. Contacts 54a disconnect the process signal from the input of amplifier 58 and contacts 54b connect said amplifier input to line 166 from the difference network 26. Contacts 54c and 54d respectively disconnect the inputs of the converter 20 and the mean integrator 18 from the output of amplifier 58. Contacts 54e connect the input 68 of the converter 20 to the output 82 of the mean integrator whereon a voltage proportional to the integral of $e$ appears. This voltage is processed by the converter and the squarer 22, and a signal proportional to the squared integral of $e$ appears on line 112 at the output 112 of the squarer. Contacts 54f have disconnected line 112 from the input of the integrator 24 but a voltage proportional to the integral of $e^2$ is still present on line 262 at the output of said integrator. Contacts 54g connect the voltage on line 112 across voltage divider (142 and 144). The potential appearing at the tap of potentiometer 160 now represents the first term of Equation 3; at the same time the potential at the tap of potentiometer 144 represents the second term thereof. The potential on line 166 is equal to the difference therebetween and represents the computed variance. This signal is connected through relay contacts 54b to the input 56 of amplifier 58, and the amplified signal is recorded on instrument 170. The timer allows a few seconds for the variance to be registered as a short vertical line on the chart as shown, whereupon the cycle is repeated.

While the present invention has been illustrated and described in conjunction with a specific apparatus wherein it is apparent that the objects of the invention have been fully accomplished, it is evident that a great many changes and modifications could be made in the disclosed apparatus, and that a number of apparently quite different embodiments of the invention could be constructed without departing from the spirit and scope thereof as is set forth in the appended claims.

What is claimed is:

1. An analog system for automatically computing the statistical variance of a characteristic subject to fluctuations in the value thereof, comprising means for receiving a first electrical signal variable with time in accordance with said fluctuations; a first integrating means having an input circuit adapted for connection to said first electrical signal and an output circuit providing a second electrical signal proportional to the time integral thereof; circuit means for squaring the value of said first signal to provide a third signal proportional to the square thereof; circuit means for squaring the value of said second electrical signal to provide a fourth signal proportional to the square of said second signal, a second integrating means having an input circuit adapted for connection to said third signal and an output circuit providing a fifth signal proportional to the time integral thereof; a switching means for routing a plurality of circuits and having a first and a second condition selectable alternatively, said first condition of said switching means connecting said inputs of said first and second integrating means to said first and third signals respectively, and said second condition of said switching means disconnecting said first condition connections; a timer means for holding said switching means in said first condition throughout a predetermined, substantially fixed period of time and thereafter transferring the same to said second condition, and indicating means responsive while said switching means is in said second condition to the difference between said fifth signal and said fourth signal for registering the variance of said characteristic.

2. A system as in claim 1 wherein said first and second integrating means each comprises an amplifier having a storage capacitor connecting the input to the output thereof, and means associated with said switching means for discharging said capacitor when said switching means is transferred from said second condition to said first condition.

3. A system as in claim 2 wherein said squaring means comprises an amplifier having a feedback circuit coupling the output voltage of said amplifier to the input thereof in opposition to a potential applied to said input, a plurality of parallel impedances connected to said input, each of said impedances having a unilaterally conducting diode in circuit therewith, a voltage source, and potentiometer means connected across said voltage source for biasing said diodes at successively increasing voltage levels.

4. An analog system for automatically computing the statistical variance of a characteristic subject to fluctuations in the value thereof, comprising means for receiving a first electrical signal variable with time in accordance with said fluctuations; a first integrating means having an input circuit adapted for connection to said first electrical signal and an output circuit providing a second electrical signal proportional to the time integral thereof; circuit means for squaring the values of said first and second electrical signals to provide a third signal proportional to the square of said first signal and a fourth signal proportional to the square of said second signal, a second integrating means having an input circuit adapted for connection to said third signal and an output circuit providing a fifth signal proportional to the time integral thereof; a switching means for routing a plurality of circuits and having a first and a second condition selectable alternatively, said first condition of said switching means connecting said inputs of said first and second integrating means to said first and third signal respectively, and said second condition of said switching means disconnecting said first condition connections; a timer means for holding said switching means in said first condition throughout a predetermined, substantially fixed period of time and thereafter transferring the same to said second condition, and indicating means responsive while said switching means is in said second condition to the difference between said fifth signal and said fourth signal for registering the variance of said characteristic.

5. An analog system for automatically computing the statistical variance of a characteristic subject to fluctuations in the value thereof, comprising means for receiving an electrical signal variable with said value of said characteristic, a first and a second integrating means each having an input adapted for connection to an electrical voltage variable with time and an output providing a voltage proportional to the time integral thereof, a squaring means having an input adapted for connection to an electrical voltage and an output providing a voltage proportional to the square thereof, a switching means for routing a plurality of circuits and having a first and a second condition selectable alternatively, said first condition of said switching means connecting the inputs of said squaring means and said first integrating means to said signal and connecting the input of said second integrating means to the output of said squaring means; said second condition of said switching means disconnecting said first condition connections and connecting the output of said first integrating means to the input of said squaring means, a timer means for holding said switching means in said first condition throughout a predetermined, substantially fixed period of time and thereafter transferring the same to said second condition, and indicating means responsive while said switching means is in said second condition to the difference between the output of said second integrating means and the output of said squaring means for registering the variance of said characteristic.

6. A system as in claim 5 wherein said first and second integrating means each comprises an amplifier having a storage capacitor connecting the input to the output thereof, and means associated with said switching means for discharging said capacitor when said switching means is transferred from said second condition to said first condition.

7. A system as in claim 6 wherein said squaring means comprises an amplifier having a feedback circuit coupling the output voltage of said amplifier to the input thereof in opposition to a potential applied to said input, a plurality of parallel impedances connected to said input, each of said impedances having a unilaterally conducting diode in circuit therewith, a voltage source, and potentiometer means connected across said voltage source for biasing said diodes at successively increasing voltage levels.

8. An analog system for automatically computing the statistical variance of a characteristic subject to fluctuations in the value thereof, comprising means for receiving an electrical signal variable with said value of said characteristic, a first and a second integrating means each having an input adapted for connection to an electrical voltage variable with time and an output providing a voltage proportional to the time integral thereof, a squaring means having an input adapted for connection to an electrical voltage and an output providing a voltage proportional to the square thereof, a switching means for routing a plurality of circuits and having a first and a second condition selectable alternatively, said first condition of said switching means connecting the inputs of said squaring means and said first integrating means to said signal and connecting the input of said second integrating means to the output of said squaring means; said second condition of said switching means disconnecting said first condition connections and connnecting the output of said first integrating means to the input of said squaring means, a timer means for holding said switching means in said first condition throughout a predetermined, substantially fixed period of time and thereafter transferring the same to said second condition, indicating means responsive while said switching means is in said second condition to the difference between the output of said second integrating means and the output of said squaring means for registering the variance of said characteristic, an input calibrating potentiometer having a variable tap, a variable voltage source for energizing said potentiometer, and means for indicating correlation of potentials on said tap with predetermined values of said characteristic for calibrating said system.

9. An analog system for automatically computing the statistical variance of a characteristic subject to fluctuations in the value thereof, comprising means for receiving a first electrical signal variable with time in accordance with said fluctuations, means for integrating said first signal to provide a second signal proportional to the time integral thereof, means for squaring the value of said first signal to provide a third signal proportional to the square thereof, means for squaring the value of said second signal to provide a fourth signal proportional to the square thereof, means for integrating said third signal to provide a fifth signal proportional to the time integral thereof, means for indicating the difference between said fourth and fifth signals so as to register said variance of said characteristic, a programmed switching device including a timer for rendering each of said integrating means operative to integrate said first and third signals for a predetermined, substantially fixed period of time and for thereafter terminating said integration operations and actuating said difference indicating means to register said difference.

References Cited in the file of this patent

UNITED STATES PATENTS

| | | |
|---|---|---|
| 2,750,110 | Och | June 12, 1956 |
| 2,910,233 | Brackmann et al. | Oct. 27, 1959 |